(12) United States Patent
Liu et al.

(10) Patent No.: US 12,442,684 B1
(45) Date of Patent: Oct. 14, 2025

(54) METHOD AND APPARATUS FOR ACQUIRING AERODYNAMIC NOISE OF COMPRESSOR, MEDIUM, AND PRODUCT

(71) Applicant: Harbin Engineering University, Harbin (CN)

(72) Inventors: Chen Liu, Harbin (CN); Xu Zhan, Harbin (CN); Zexi Wu, Harbin (CN); Yipeng Cao, Harbin (CN); Yang Liu, Harbin (CN); Jie Yang, Harbin (CN); Jie Guo, Harbin (CN); Xinyu Zhang, Harbin (CN)

(73) Assignee: Harbin Engineering University, Harbin (CN)

( * ) Notice: Subject to any disclaimer, the term of this patent is extended or adjusted under 35 U.S.C. 154(b) by 0 days.

(21) Appl. No.: 19/028,180

(22) Filed: Jan. 17, 2025

(30) Foreign Application Priority Data

Apr. 11, 2024  (CN) .......................... 202410431700.X

(51) Int. Cl.
*G01H 17/00* (2006.01)

(52) U.S. Cl.
CPC .................. *G01H 17/00* (2013.01)

(58) Field of Classification Search
None
See application file for complete search history.

(56) References Cited

U.S. PATENT DOCUMENTS

| | | | |
|---|---|---|---|
| 2002/0183947 A1* | 12/2002 | Ando | G01H 3/10 702/75 |
| 2007/0189546 A1* | 8/2007 | Togawa | G01H 3/08 381/61 |
| 2014/0039809 A1* | 2/2014 | Girondin | G01M 13/045 702/39 |
| 2016/0076970 A1* | 3/2016 | Takahashi | G06N 20/00 702/33 |

FOREIGN PATENT DOCUMENTS

KR  20220098542 A  * 7/2022

* cited by examiner

*Primary Examiner* — Lisa M Caputo
*Assistant Examiner* — Cynthia L Davis
(74) *Attorney, Agent, or Firm* — WCF IP

(57) ABSTRACT

A method and apparatus for acquiring aerodynamic noise of a compressor, a medium, and a product are provided. The method includes: performing inverse Fourier transform on a known frequency-domain noise spectrum to obtain known time-domain noise data, then predicting unknown time-domain noise using a time series neural network, obtaining finer time-frequency noise data in combination with the known time-frequency noise data, and finally, performing Fourier transform on the finer time-frequency noise data to obtain new frequency-domain noise data. Limitations of a limited time step and a total simulation time on the acquisition of aerodynamic noise data in traditional numerical calculation of aerodynamic noise can be overcome. Finer aerodynamic noise data can be acquired rapidly and accurately. The frequency resolution of the noise spectrum can be increased, and reducing the consumption of computing resources and saving manpower and material resources can be achieved.

8 Claims, 8 Drawing Sheets

METHOD AND APPARATUS FOR ACQUIRING AERODYNAMIC NOISE OF COMPRESSOR, MEDIUM, AND PRODUCT

CROSS REFERENCE TO RELATED APPLICATION

This patent application claims the benefit and priority of Chinese Patent Application No. 202410431700X, filed with the China National Intellectual Property Administration on Apr. 11, 2024, the disclosure of which is incorporated by reference herein in its entirety as part of the present application.

TECHNICAL FIELD

The present disclosure relates to the field of aerodynamic noise analysis, and in particular, to a method and apparatus for acquiring aerodynamic noise of a compressor, a medium, and a product.

BACKGROUND

The compressor is a common industrial device for compressing air or gas. However, the compressor will produce noise during operation, which will have a negative impact on the surrounding environment and people's health.

Existing methods for acquiring aerodynamic noise data mainly focus on experimental testing and numerical calculation. Although test data can be obtained rapidly and accurately by experimental testing, personnel and equipment are required, leading to a need for a large quantity of manpower and material resources and a too long test cycle. For the numerical calculation, although aerodynamic noise data under different working conditions is acquired through calculation using a constructed numerical model, the time step is mainly related to the rotating speed of an impeller. It is generally required that an angle a single impeller of a centrifugal compressor rotates within each time step under a calculated rotating speed is not more than 2°, and the greater the rotating speed, the smaller the time step. Therefore, the acquisition of long-time domain high-rotating speed noise source information is limited by a small time step and high computing resource consumption, thus affecting the resolution of frequency-domain noise data.

SUMMARY

An objective of the present disclosure is to provide a method and apparatus for acquiring aerodynamic noise of a compressor, a medium, and a product. Limitations of a limited time step and a total simulation time on the acquisition of aerodynamic noise data in traditional numerical calculation of aerodynamic noise can be overcome. Finer aerodynamic noise data can be acquired rapidly and accurately. The frequency resolution of a noise spectrum can be increased, and reducing the consumption of computing resources and saving manpower and material resources can be achieved.

To achieve the above objective, the present disclosure provides the following technical solutions.

In a first aspect, the present disclosure provides a method for acquiring aerodynamic noise of a compressor, including:

acquiring first aerodynamic noise frequency-domain data of a compressor in a historical time period under a target working condition continuously, where the first aerodynamic noise frequency-domain data includes corresponding sound pressure levels of aerodynamic noise at different frequencies;

performing inverse Fourier transform on the first aerodynamic noise frequency-domain data to obtain corresponding first aerodynamic noise time-domain data, where the first aerodynamic noise time-domain data includes a sound pressure corresponding to each historical time step;

determining an actual acquisition time of the first aerodynamic noise frequency-domain data according to all the historical time steps;

determining a predicted aerodynamic noise time according to a target acquisition time and the actual acquisition time, where the predicted aerodynamic noise time includes each future time step;

with each future time step as an input, outputting a sound pressure corresponding to each future time step using a trained nonlinear autoregressive neural network model;

obtaining second aerodynamic noise time-domain data corresponding to the target acquisition time according to the sound pressure corresponding to each historical time step and the sound pressure corresponding to each future time step; and performing Fourier transform on the second aerodynamic noise time-domain data to obtain second aerodynamic noise frequency-domain data, where a frequency range corresponding to the second aerodynamic noise frequency-domain data is the same as a frequency range corresponding to the first aerodynamic noise frequency-domain data.

Optionally, a formula of the inverse Fourier transform may be as follows:

$$f(t) = \frac{1}{2\pi}\int_{-\infty}^{\infty} F(\omega)e^{j\omega t}d\omega;$$

where f(t) represents the first aerodynamic noise time-domain data; F(ω) represents the first aerodynamic noise frequency-domain data; ω represents a frequency; and e is a Euler number.

Optionally, a training process of the nonlinear autoregressive neural network model may include:

selecting a certain proportion of the first aerodynamic noise time-domain data as training samples;

training the nonlinear autoregressive neural network model with each historical time step in the training samples as an input and a predicted sound pressure as a label;

optimizing the nonlinear autoregressive neural network model using Bayesian regularization algorithm;

calculating a loss error between the predicted sound pressure output by the optimized nonlinear autoregressive neural network model and a corresponding actual sound pressure using a loss function; and when the loss error is less than a threshold, completing the training of the nonlinear autoregressive neural network model.

Optionally, after obtaining the corresponding first aerodynamic noise time-domain data, the method may further include:

preprocessing the first aerodynamic noise time-domain data, where the preprocessing includes reversible instance normalization processing and data cleaning processing.

Optionally, the loss function may be expressed as:

$$J(\theta) = \frac{\sum_{i=1}^{n}(\widetilde{f(t)} - f(t))^2}{n}$$

where J(θ) represents a value of the loss function; $\widetilde{f(t)}$ represents the predicted sound pressure; f(t) represents the actual sound pressure, namely the first aerodynamic noise time-domain data; and n represents a number of training samples.

In a second aspect, the present disclosure provides a computer system, including a memory, a processor, and a computer program stored on the memory and runnable on the processor, where the processor is configured to execute the computer program to implement the steps of the method for acquiring aerodynamic noise of a compressor as described above.

In a third aspect, the present disclosure provides a computer-readable storage medium, storing a computer program which, when executed by a processor, implements the steps of the method for acquiring aerodynamic noise of a compressor as described above.

In a fourth aspect, the present disclosure provides a computer program product, including a computer program which, when executed by a processor, implements the steps of the method for acquiring aerodynamic noise of a compressor as described above.

According to specific embodiments provided in the present disclosure, the present disclosure has the following technical effects:

The present disclosure provides a method and apparatus for acquiring aerodynamic noise of a compressor, a medium, and a product. The method includes: performing inverse Fourier transform on a known frequency-domain noise spectrum to obtain known time-domain noise data, then predicting unknown time-domain noise using a time series neural network, obtaining finer time-frequency noise data in combination with the known time-frequency noise data, and finally, performing Fourier transform on the finer time-frequency noise data to obtain new frequency-domain noise data. Limitations of a limited time step and a total simulation time on the acquisition of aerodynamic noise data in noise testing can be overcome. Finer aerodynamic noise data can be acquired rapidly and accurately. The frequency resolution of the noise spectrum can be increased, and reducing the consumption of computing resources and saving manpower and material resources can be achieved.

BRIEF DESCRIPTION OF THE DRAWINGS

To describe the technical solutions in the embodiments of the present disclosure or in the prior art more clearly, the accompanying drawings required in the embodiments are briefly described below. Apparently, the accompanying drawings in the following description show merely some embodiments of the present disclosure, and those of ordinary skill in the art may still derive other accompanying drawings from these accompanying drawings without creative efforts.

DETAILED DESCRIPTION OF THE EMBODIMENTS

The technical solutions in the embodiments of the present disclosure are described clearly and completely below with reference to the accompanying drawings in the embodiments of the present disclosure. Apparently, the described embodiments are merely some rather than all of the embodiments of the present disclosure. All other embodiments obtained by those skilled in the art based on the embodiments of the present disclosure without creative efforts shall fall within the protection scope of the present disclosure.

An objective of the present disclosure is to provide a method and apparatus for acquiring aerodynamic noise of a compressor, a medium, and a product. Limitations of a limited time step and a total simulation time on the acquisition of aerodynamic noise data in noise testing can be overcome. Finer aerodynamic noise data can be acquired rapidly and accurately. The frequency resolution of a noise spectrum can be increased, and reducing the consumption of computing resources and saving manpower and material resources can be achieved.

To make the above objectives, features, and advantages of the present disclosure clearer and more comprehensible, the present disclosure will be further described in detail below with reference to the accompanying drawings and the specific examples.

Example 1

Figure 1:
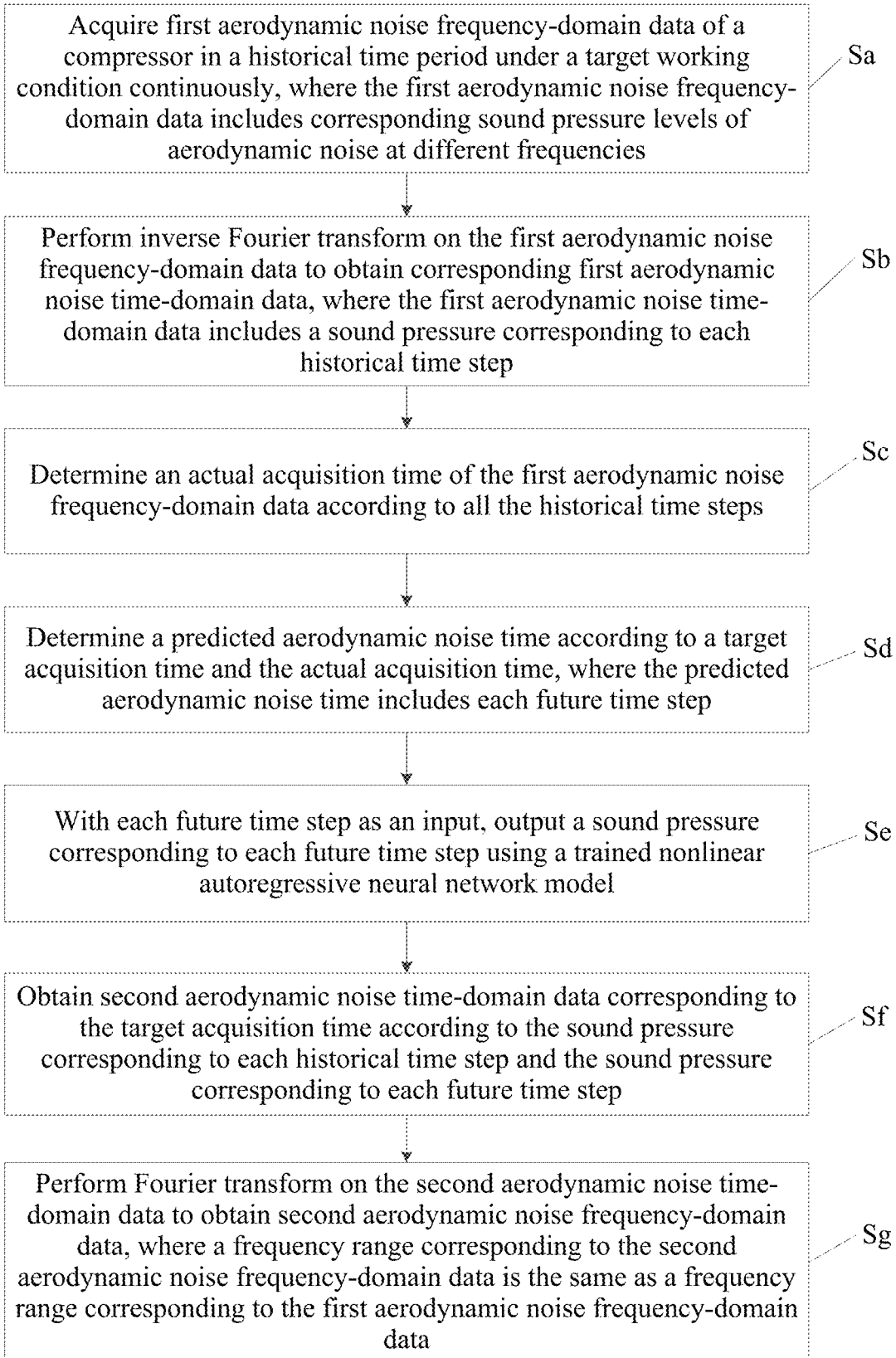
FIG. 1 is a flowchart of a method for acquiring aerodynamic noise of a compressor provided in Example 1 of the present disclosure.

As shown in FIG. 1, a method for acquiring aerodynamic noise of a compressor in this example includes the following steps.

Figure 2:
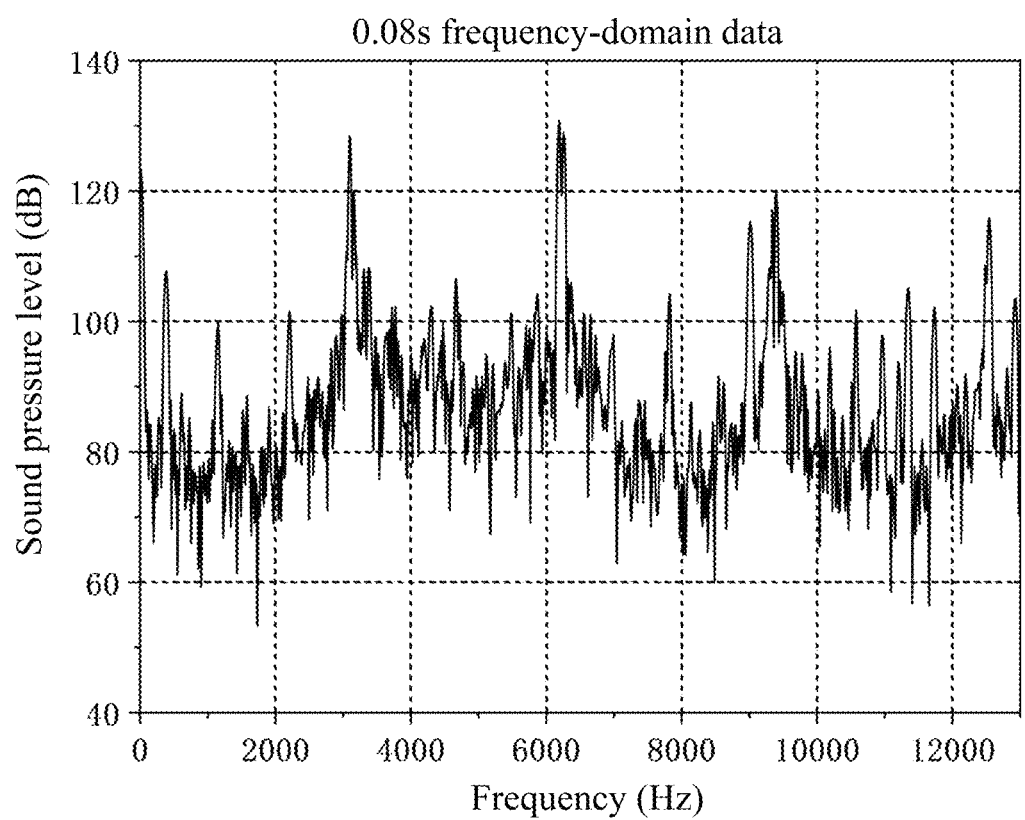
FIG. 2 is a frequency domain diagram of first aerodynamic noise in Example 1.

In step Sa, first aerodynamic noise frequency-domain data of a compressor in a historical time period under a target working condition is acquired continuously. As shown in FIG. 2, the first aerodynamic noise frequency-domain data includes corresponding sound pressure levels of aerodynamic noise at different frequencies.

Figure 3:
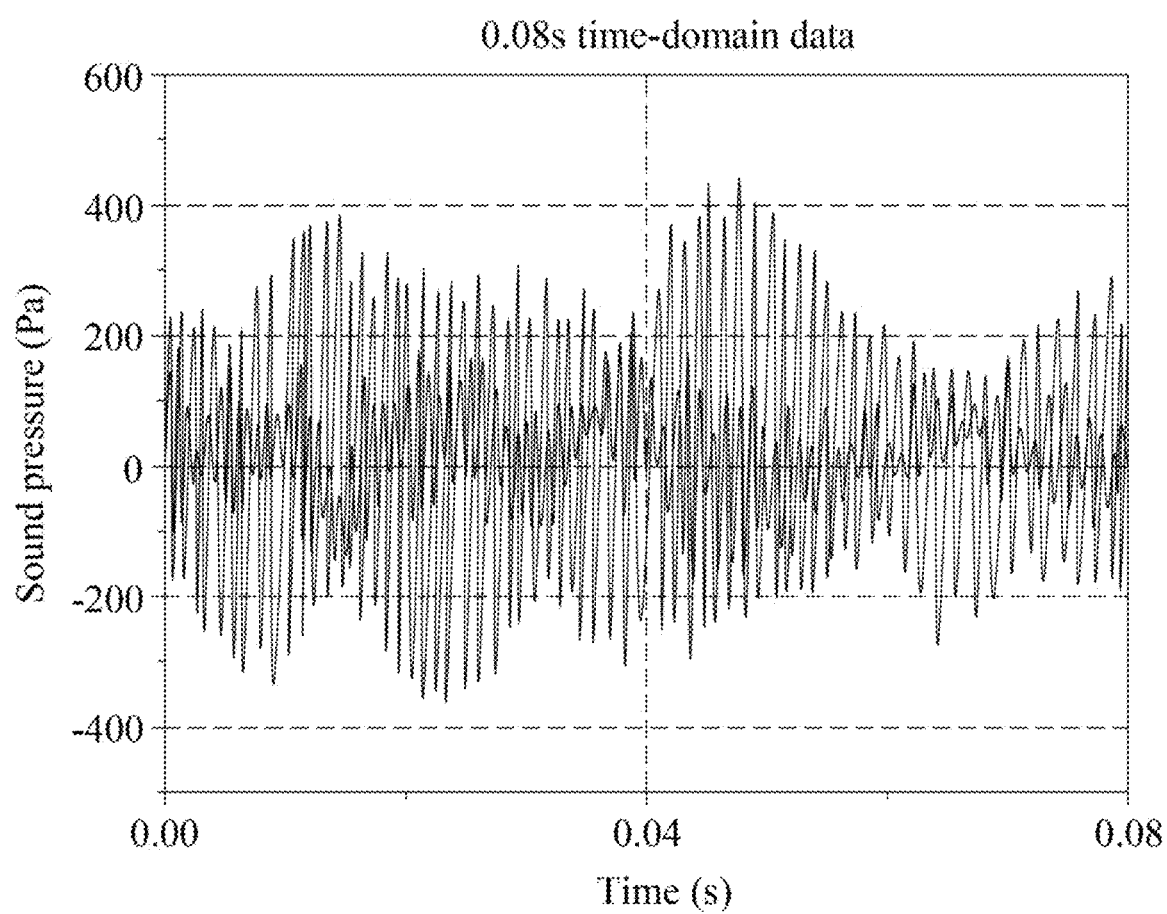
FIG. 3 is a time domain diagram of the first aerodynamic noise in Example 1.

In step Sb, inverse Fourier transform is performed on the first aerodynamic noise frequency-domain data to obtain corresponding first aerodynamic noise time-domain data. As shown in FIG. 3, the first aerodynamic noise time-domain data includes a sound pressure corresponding to each historical time step.

The inverse Fourier transform (IFT) is an inverse operation of Fourier transform and used to convert a signal expressed in frequency domain to a time-frequency signal. The principle of the inverse Fourier transform is based on the orthogonal properties of the Fourier transform. The orthogonal properties indicate that the Fourier transform and the inverse Fourier transform are symmetrical operations. The inverse Fourier transform is to decompose a time-domain signal into a frequency-domain representation, while the inverse Fourier transform is to restore a signal expressed in frequency domain to time domain. A formula of the inverse Fourier transform is as follows:

$$f(t) = \frac{1}{2\pi} \int_{-\infty}^{\infty} F(\omega) e^{j\omega t} d\omega$$

where f(t) represents an aerodynamic noise time-domain, which refer to the first aerodynamic noise time-domain data here; F($\omega$) represents an aerodynamic noise frequency-domain signal, which refer to the first aerodynamic noise frequency-domain data here; $\omega$ represents a frequency; and e is a Euler number. This formula represents a process of converting the frequency-domain signal F($\omega$) to the time-domain signal f(t). A signal value corresponding to each time point t is obtained by weighting and integrating the frequency-domain signal at all frequencies. The inverse Fourier transform is widely used to restore waveform information of an original signal from a frequency spectrum, and to perform conversion between frequency domain and time domain in the fields of signal processing, image processing, communications, etc.

In step Sc, an actual acquisition time of the first aerodynamic noise frequency-domain data is determined according to all the historical time steps.

In step Sd, a predicted aerodynamic noise time is determined according to a target acquisition time and the actual acquisition time, where the predicted aerodynamic noise time includes each future time step.

In step Se, with each future time step as an input, a sound pressure corresponding to each future time step is output using a trained nonlinear autoregressive neural network model.

In step Sf, second aerodynamic noise time-domain data corresponding to the target acquisition time is obtained according to the sound pressure corresponding to each historical time step and the sound pressure corresponding to each future time step.

The Fourier transform is to convert a signal from a time-frequency representation to a frequency-domain representation. Its principle is to decompose the time-frequency signal into superpositions of a series of complex-exponential functions, representing amplitudes and phase information of different frequency components. A formula of the Fourier transform is as follows:

$$F(\omega) = \int_{-\infty}^{\infty} f(t) e^{j\omega t} d\omega.$$

This formula represents a process of converting the time-domain signal f(t) to the frequency-domain signal F($\omega$). A signal value corresponding to each frequency $\omega$ is obtained by weighting and integrating the frequency-domain signal at all times.

Figure 4:
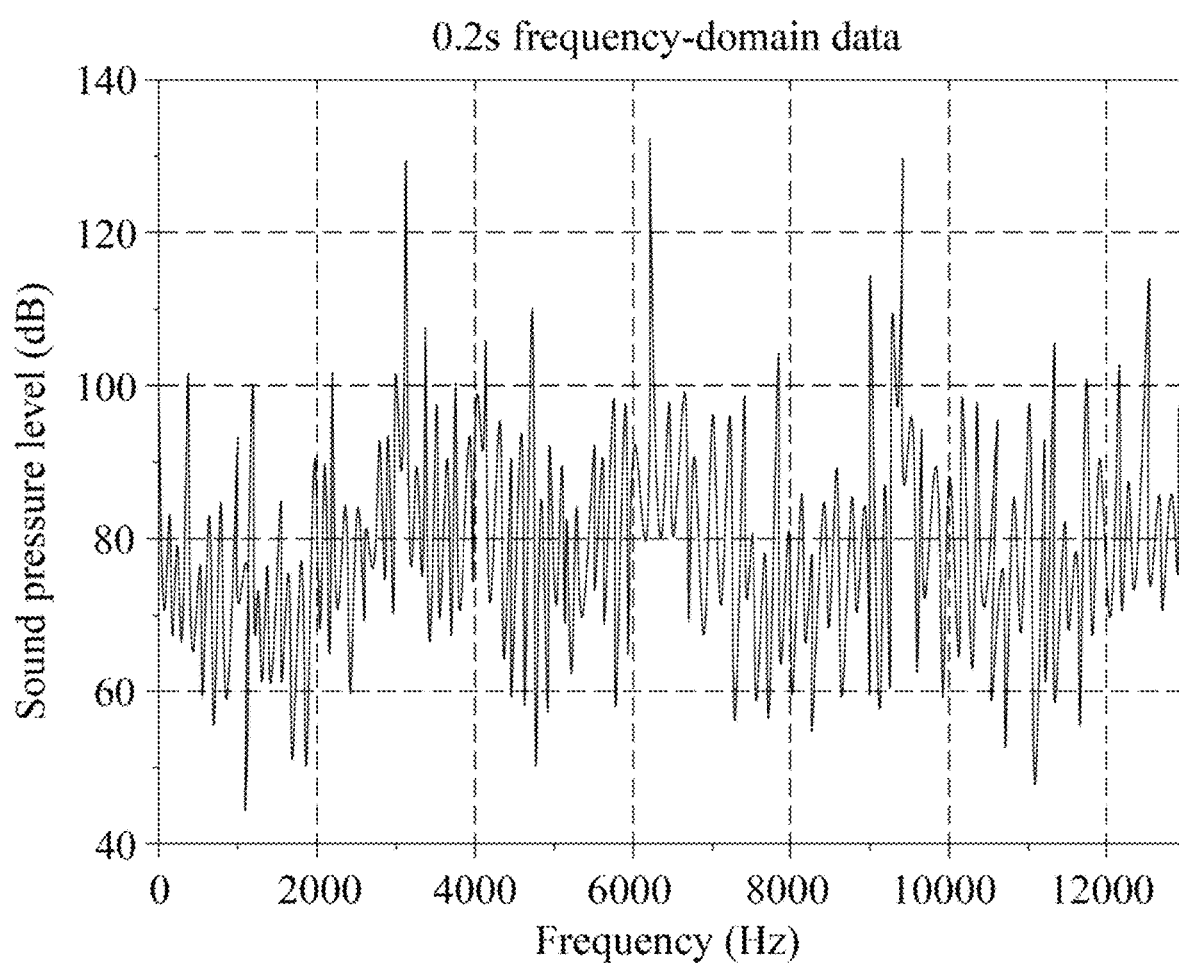
FIG. 4 is a frequency domain diagram of second aerodynamic noise in Example 1.
Figure 5:
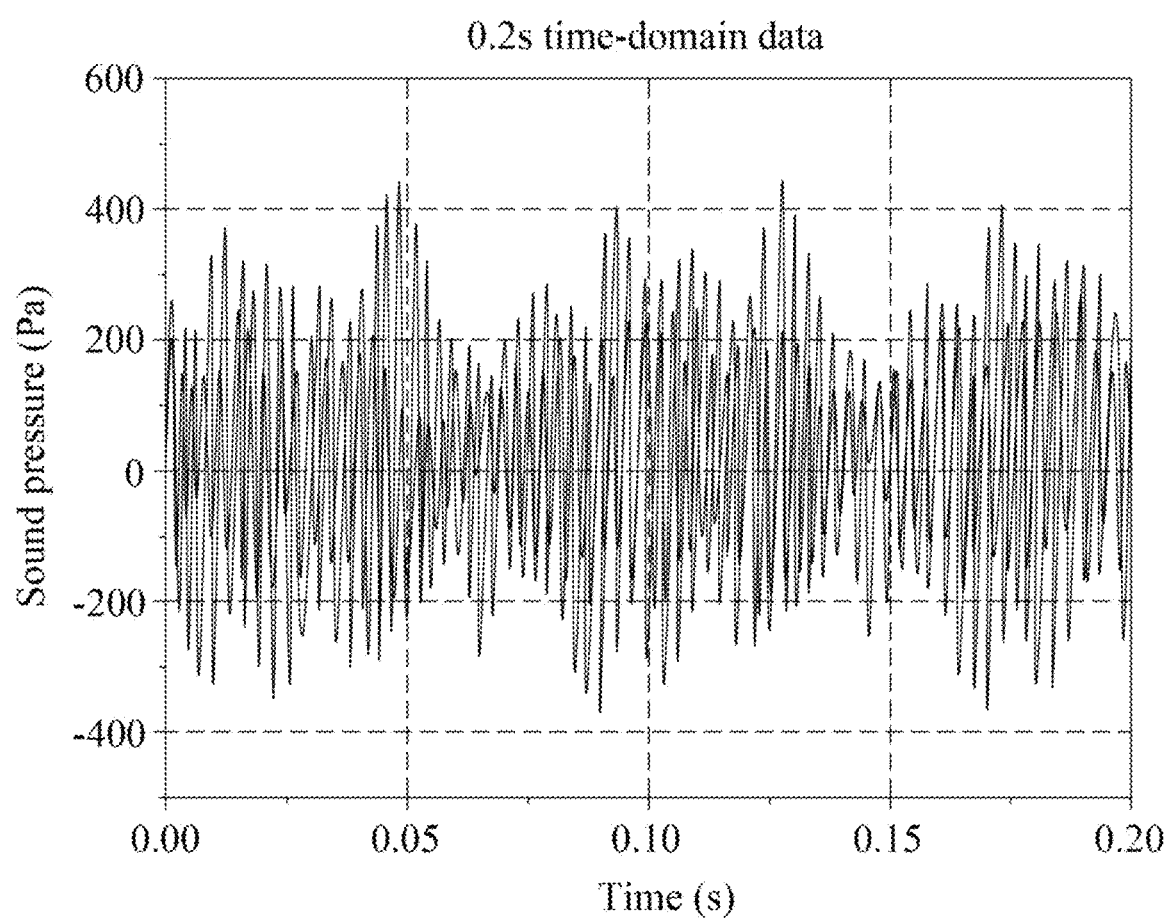
FIG. 5 is a time domain diagram of the second aerodynamic noise in Example 1.

In step Sg, Fourier transform is performed on the second aerodynamic noise time-domain data to obtain second aerodynamic noise frequency-domain data, where a frequency range corresponding to the second aerodynamic noise frequency-domain data is the same as a frequency range corresponding to the first aerodynamic noise frequency-domain data. FIG. 4 illustrates a schematic diagram of the second aerodynamic noise frequency-domain data, and FIG. 5 illustrates a schematic diagram of the second aerodynamic noise time-domain data.

In this example, by performing the following steps, a time series prediction model is constructed, and training data is trained based on the time series prediction model. Specific steps are as follows.

(1) A certain proportion of the first aerodynamic noise time-domain data is selected as training samples.

In order to improve the accuracy of a prediction result, the first aerodynamic noise time-domain data needs to be pre-processed, where the preprocessing includes reversible instance normalization processing and data cleaning processing.

Reversible instance normalization (RIN) is a common data preprocessing method for normalizing data to a specific range while maintaining the data reversibility before and after normalization.

Specific steps of the RIN are as follows.

A maximum value (max_val) and a minimum value (min_val) of data are calculated.

For each data point x, the following operations are performed.

x is normalized to a range [0, 1]:

$$\text{normalized\_x} = (x - \text{min\_val})/(\text{max\_val} - \text{min\_val}).$$

The normalized data is mapped back to an original range:

$$\text{reversed\_x} = \text{normalized\_x} * (\text{max\_val} - \text{min\_val}) + \text{min\_val}.$$

In this way, reversed_x is the reversible normalization result of the original data point x.

The RIN serves to map data to a fixed range, and a common range is [0, 1]. The benefit of doing so is that a scale difference between data can be eliminated such that the data having different features has comparability.

In the following process, the normalized data can be restored to the original data through an inverse operation.

In this example, the first aerodynamic noise time-domain data is divided into a training set, a test set, and a validation set in a ratio of 8:1:1.

(2) The nonlinear autoregressive neural network model is trained with each historical time step in the training sample as an input and a predicted sound pressure as a label.

The stationarity and a lag order of the nonlinear autoregressive neural network model are determined by plotting an autocorrelation function.

A correlation shows a correlation between a time series and a lagged version thereof. If an obvious trend or periodicity is observed on the autocorrelation function, the time series might not be stationary.

Autocorrelation refers to a degree of correlation of values of the same time series at different times. Assuming the time series $X_t$, t=1,2,3, . . . , the correlation between times t and t+n is autocorrelation of order n, defined as follows:

$$acf_n = f(X_y, X_{t+n}) = r_{X_t X_{t+n}} = \frac{\sum (X_t - \bar{X}_t)(X_{t+n} - \bar{X}_{t+n})}{\sqrt{\sum (X_t - \bar{X}_t)^2 \sum (X_{t+n} - \bar{X}_{t+n})^2}}.$$

Figure 6:
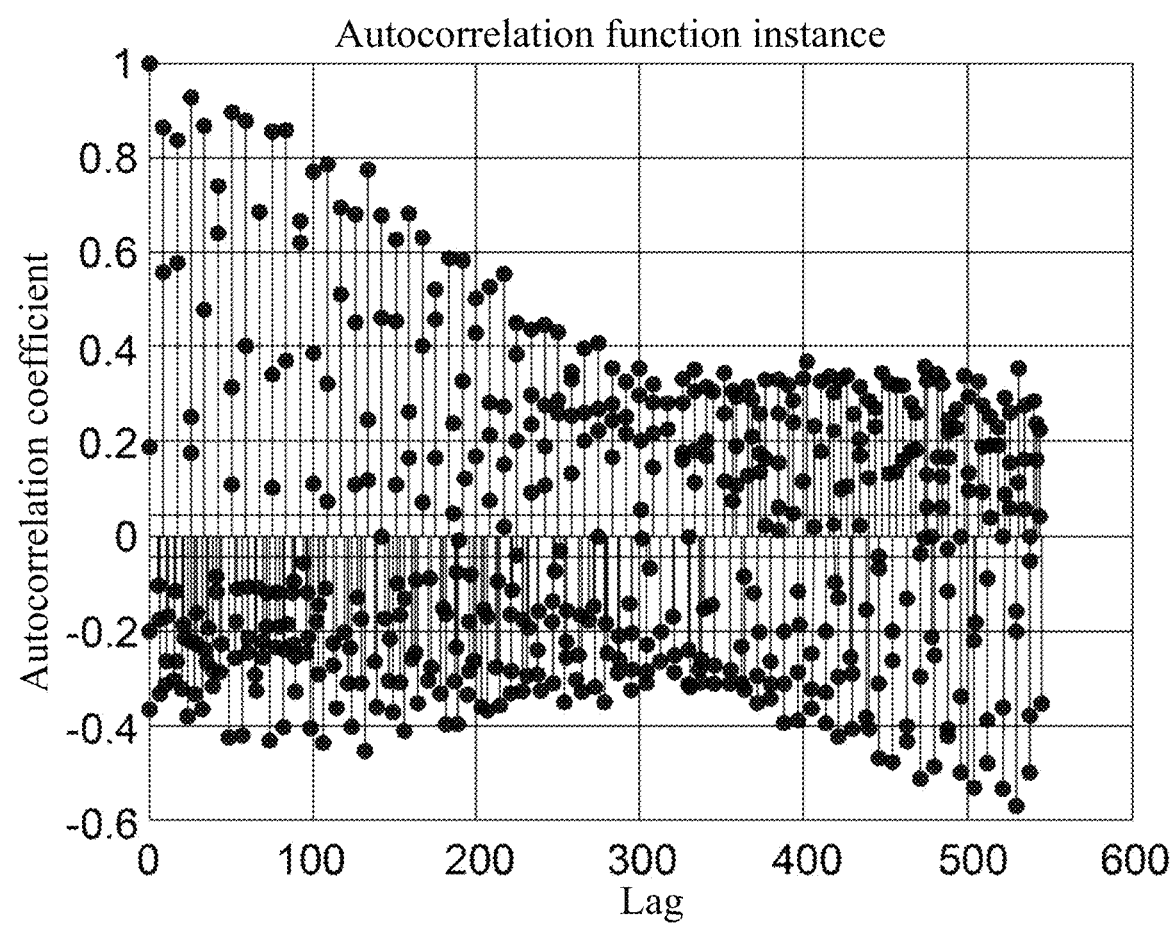
FIG. 6 is an autocorrelation function and a partial autocorrelation function of a series in Example 1.

A time lag order of the nonlinear autoregressive model can be determined by observing the autocorrelation function (ACF) and the partial autocorrelation function (PACF) of the series, as shown in FIG. 6. The autocorrelation plot is used to display the correlation between different time lags in a time series. The partial autocorrelation plot is used to measure the correlation in a time series after removing the influence of intermediate lags. By observing the ACF, one can identify the periodicity and trends in a time series, aiding in the selection of an appropriate model; observing the PACF can help determine the order of the autoregressive part.

The basic structure of the nonlinear autoregressive neural network (NARNET) model includes one autoregressive layer and one nonlinear activation function layer. The autoregressive layer uses input and output values at a past time as inputs, and a nonlinear relationship between the input and output values is established using a hidden layer of the neural network. The nonlinear activation function layer performs nonlinear mapping on an output of the autoregressive layer to obtain a final model prediction result. An NAR network therein is mainly utilized in this example.

The NAR network is a recurrent neural network and forms a discrete nonlinear autoregressive system, and only involves one series in the second-type time series problem. A future value of the time series y(t) is predicted only according to a past value of the time series. It can be written in the following form:

$$y_t = f(y_{t-1}, \ldots, y_{t-d}) + \varepsilon_t.$$

Therefore, an NAR neutral network (NARNN) is exactly defined from such an equation as:

$$y_t = \sum_{j=1}^{k} w_j h_5\left(\sum_{i=1}^{a} w_{ij} y_{t-i} + b_{0j}\right) + b_0 + \varepsilon_t;$$

where a is a number of input units; k is a number of hidden layers with activation functions; $w_{ij}$ is a weight of connection between an input unit i and a hidden layer unit j; $w_j$ is a parameter of a connection weight between the hidden unit j and an output unit; and $b_0$ and $b_{0j}$ are bias terms of corresponding neurons, respectively.

A mean square error function is used as a loss function, expressed as:

$$J(\theta) = MSE = \frac{\sum_{i=1}^{n} (\widetilde{f(t)} - f(t))^2}{n};$$

where $J(\theta)$ represents a value of the loss function; $\widetilde{f(t)}$ represents the predicted sound pressure; f(t) represents the actual sound pressure, namely the first aerodynamic noise time-domain data; and n represents a number of training samples.

(3) The nonlinear autoregressive neural network model is optimized using Bayesian regularization algorithm.

The Bayesian regularization algorithm is used as an optimization algorithm. The activation function used in the hidden layer is Tan-Sigmoid function; a pure linear function & is used for an output layer; and the Tan-Sigmoid function is a common method for processing nonlinear characteristics, with a function formula expressed as:

$$f(x, T, s) = 1 - \frac{2}{1 + e^{\frac{2(x-s)}{T}}}.$$

(4) A loss error between the predicted sound pressure output by the optimized nonlinear autoregressive neural network model and a corresponding actual sound pressure is calculated using the loss function.

(5) When the loss error is less than a threshold, the training of the nonlinear autoregressive neural network model is completed.

The performance of the nonlinear autoregressive neural network model is verified using the mean square error (MSE) and a determination coefficient ($R^2$) in this example, which are defined respectively as:

$$MSE = \frac{\sum_{i=1}^{n} (\widetilde{f(t)} - f(t))^2}{n};$$

$$R^2 = 1 - \frac{\sum_{i=1}^{n} (\widetilde{f(t)} - f(t))^2}{\sum_{i=1}^{n} (\widetilde{f(t)} - \overline{f(t)})^2};$$

where $\overline{f(t)}$ is a mean value of actual data.

A root mean square error can well measure a deviation between a predicted value and a true value. The smaller the error, the higher the accuracy of the prediction model. The smaller the value of a mean absolute percentage error, the more perfect the model. It is generally considered that the effect is good when $R^2$ is higher than 0.8. The closer to 1, the better the effect.

Figure 7:
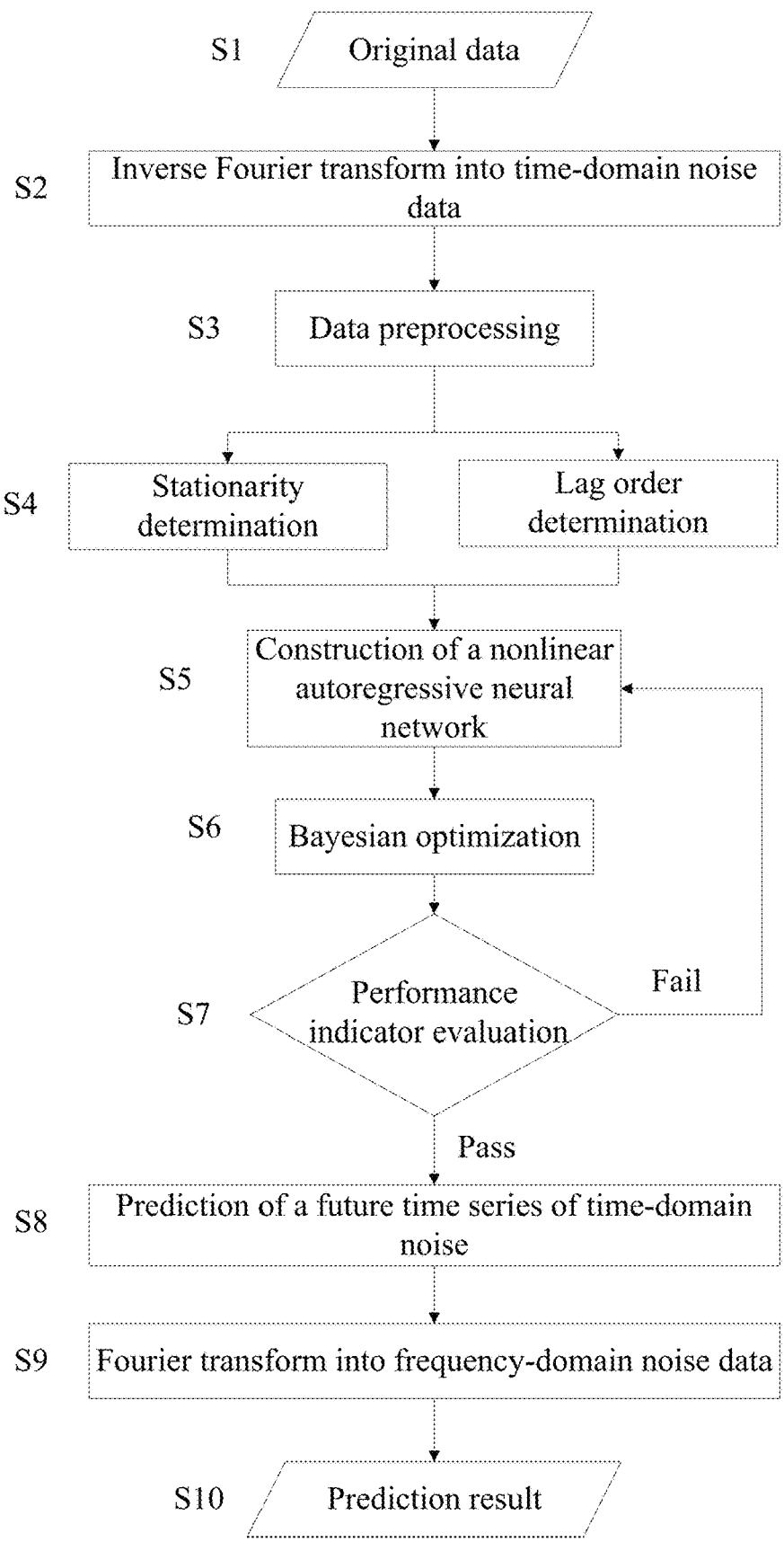
FIG. 7 is a schematic diagram of a process of performing a method for acquiring aerodynamic noise of a compressor in Example 1.
Figure 8:
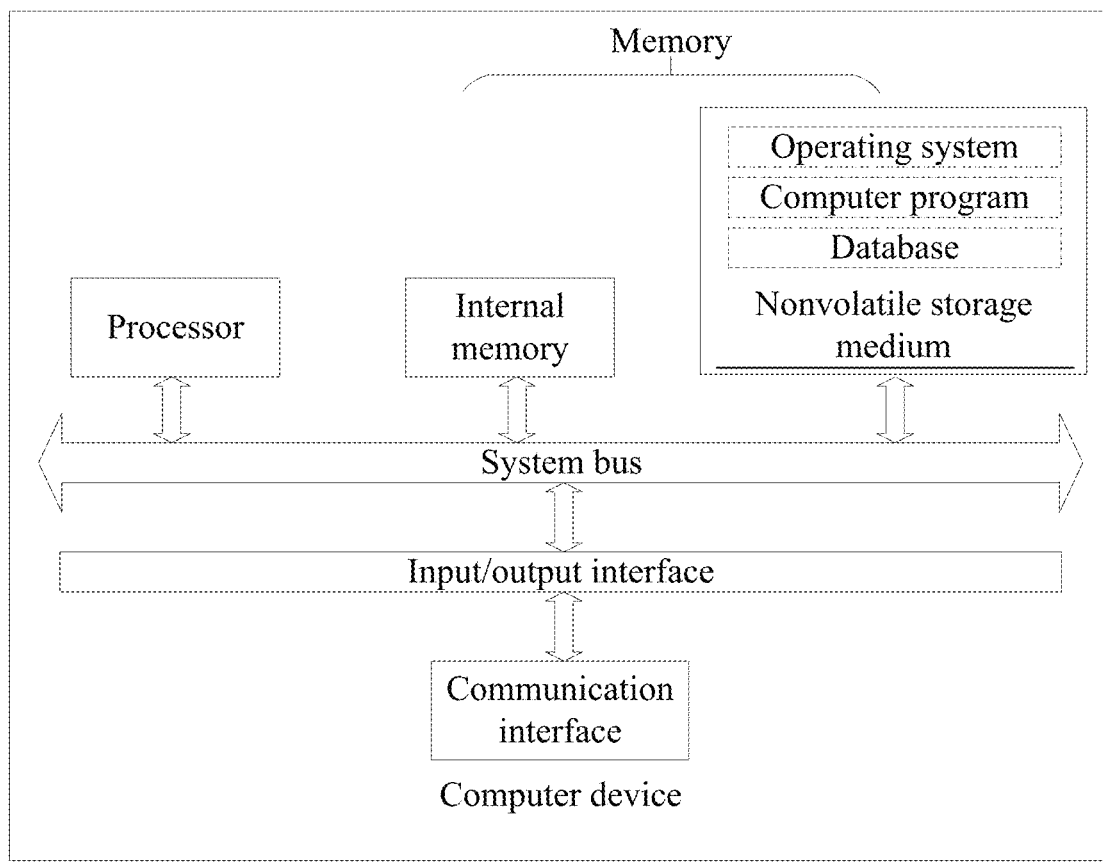
FIG. 8 is a diagram of an internal structure of a computer device.

As shown in FIG. 7, a performing process of this example includes the following steps.

In step S1, original data is input.

An original data table is loaded and read, and the input original data D=[X, Y] is a bivariate time series, including frequencies and aerodynamic noise sound pressure levels.

In step S2, the original data is converted to time-frequency noise data by inverse Fourier transform.

The original aerodynamic noise frequency band spectrum data is converted to time-domain noise using the method of the inverse Fourier transform.

In step S3, the data is preprocessed.

The converted time-frequency data is cleaned, including removing repeated rows, adding missing values, processing outliers, etc., thereby ensuring the completeness and usability of the data and providing reliable data guarantee for subsequent modeling.

In step S4, the stationarity and a lag order are determined.

A time lag order of the autoregressive model can be determined by observing the autocorrelation function (ACF) of the series. The ACF shows the correlation of the series and itself on different time lag orders, and by observing the ACF, a suitable time lag order can be determined.

In step S5, a nonlinear autoregressive neural network is constructed.

The basic structure of the nonlinear autoregressive neural network includes one autoregressive layer and one nonlinear activation function layer. The autoregressive layer uses input and output values at a past time as inputs, and a nonlinear relationship between the input and output values is established using a hidden layer of the neural network. The nonlinear activation function layer performs nonlinear mapping on an output of the autoregressive layer to obtain a final model prediction result.

In step S6, Bayesian optimization is performed.

The activation function used in the hidden layer is Tan-Sigmoid function; a pure linear function & is used for the output layer; and the Tan-Sigmoid function is a common method for processing nonlinear characteristics.

In step S7, performance indicators are evaluated.

The model is optimized with the validation set, and whether the performance indicators of the model reach expectations is evaluated with the test set. Thus, the trained time series prediction model is obtained.

In step S8, a future time series of time-domain noise is predicted.

The future time series of the time-domain noise data under this working condition is predicted with the trained model to obtain the time-domain noise data of the future time series.

In step S9, the time-domain noise data is converted to frequency-domain noise data by Fourier transform.

The known time-domain data and the predicted time-domain data are converted to the frequency-domain noise data by the Fourier transform to achieve the purpose of increasing the resolution of the noise frequency band spectrum.

In S10, a prediction result is obtained.

The prediction result is output into a table.

In this example, the inverse Fourier transform is performed on a known frequency-domain noise spectrum to obtain known time-domain noise data; the time-domain noise of a centrifugal compressor is then predicted using the time series neutral network, and finer time-domain noise data is obtained in combination with the known time-domain noise data; and finally, the Fourier transform is performed on the finer time-frequency noise data to obtain new frequency-domain noise data. Thus, the resolution of the frequency-domain noise data is increased, and more accurate peak prediction is achieved. On this basis, the frequency resolution of the noise spectrum can be increased. A finer future aerodynamic noise frequency band spectrum is obtained by prediction and optimization according to the existing coarse aerodynamic noise frequency band spectrum.

The main purpose of increasing the resolution of the aerodynamic noise spectrum in this example is to more accurately analyze and evaluate the frequency spectrum characteristics of the noise, and increasing the resolution of the aerodynamic noise spectrum can provide more accurate and detailed frequency spectrum information, which is conducive to the analysis, identification and control of a noise source. To achieve this purpose, it is first based on the known aerodynamic noise frequency-domain data of the compressor under specific working conditions. Then, the inverse Fourier transform is performed on these data to obtain time-domain noise, and the data is converted to time series data and divided into a training set and a test set. Next, a time series neutral network model is constructed and trained with the training set. In the training process, the parameters of the model can be adjusted using some optimization algorithms to improve the prediction effect. Finally, the trained model is used to perform prediction on the test set, and the accuracy and the reliability of the prediction result are evaluated. With such a prediction method based on the time series neutral network, accurate prediction on the aerodynamic noise time-domain data of the compressor can be achieved. Finally, the Fourier transform is performed on the predicted time-domain data and the known time-domain data to obtain finer frequency-domain data. This solves the limitations of a limited time step and a total simulation time on the resolution of the noise spectrum in noise testing. This method also has certain practicability and promotional value and can be widely used in engineering practice in related fields of compressors.

In this example, the Fourier transform is combined with the nonlinear autoregressive neural network to predict aerodynamic noise data with a small time step so that long-time frequency noise source information can be obtained. The purpose of acquiring a high-resolution noise spectrum based on limited data is achieved. The resolution of the aerodynamic noise spectrum can be increased rapidly and accurately, and the frequency spectrum characteristics of the noise can be analyzed and evaluated more accurately. This example does not need a too long measure or prediction cycle and saves manpower and material resources, and has a low requirement on computing resources and has a certain engineering practice value.

In one embodiment, the design of the compressor is optimized based on the second aerodynamic noise frequency-domain data. For example, octave peaks are obtained based on the second aerodynamic noise frequency-domain data, design defects of the compressor are identified based on the octave peaks and the design of the compressor is optimized based on the design defects. As an example, the design defects of the compressor may include impeller imbalance, improper blade angles or improper blade clearances.

By increasing the resolution of the aerodynamic noise spectrum, more accurate noise analysis can be achieved, which is critical for the identification and characterization of noise sources and the design and implementation of noise control measures. High-resolution noise data enables engineers to observe minute changes in the noise spectrum in detail, so that they can accurately differentiate between different types of noise, such as mechanical vibration, airflow disturbances, and so on.

This ability to analyze the spectrum in fine detail not only helps to determine the specific source of the noise, but also allows for the design of more effective noise reduction measures for specific frequency components, such as frequency-specific mufflers or soundproofing materials. In addition, accurate noise analysis can optimize product design to anticipate and prevent potential noise problems, thus improving overall product performance and user experience. In conclusion, improving the resolution of the aerodynamic noise spectrum not only enhances the understanding of equipment noise behavior, but also greatly improves the efficiency and effectiveness of noise management.

Example 2

A computer apparatus includes a memory, a processor, and a computer program stored on the memory and runnable on the processor. The processor is configured to execute the computer program to implement the steps of the method for acquiring aerodynamic noise of a compressor in Example 1.

Example 3

A computer-readable storage medium stores a computer program which, when executed by a processor, implements the steps of the method for acquiring aerodynamic noise of a compressor in Example 1.

Example 4

A computer program product includes a computer program which, when executed by a processor, implements the steps of the method for acquiring aerodynamic noise of a compressor in Example 1.

Example 5

A computer device is provided. The computer device may be a database and can have an internal structure shown in FIG. 3. The computer device includes a processor, a memory, an input/output interface (I/O), and a communication interface. The processor, the memory, and the input/output interface are connected through a system bus, and the communication interface is connected to the system bus through the input/output interface. The processor of the computer device is configured to provide computing and control capabilities. The memory of the computer device includes a nonvolatile storage medium and an internal memory. The non-volatile storage medium stores an operating system, a computer program, and a database. The internal memory provides an environment for operation of the operating system and the computer program in the nonvolatile storage medium. The database of the computer device is configured to store pending transactions. The input/output interface of the computer device is configured to exchange information between the processor and an external device. The communication interface of the computer device is configured to communicate with an external terminal through a network. The computer program, when executed by the processor, implements the method for acquiring aerodynamic noise of a compressor in Example 1.

It is to be noted that information of an object (including but not limited to device information of the object, personal information of the object and the like) and data (including but not limited to data for analysis, data for storage, data for exhibition and the like) in the present disclosure are information and data authorized by the object or fully authorized by each party, and relevant data shall be acquired, used and processed according to laws, regulations and standards of related countries and regions.

Those of ordinary skill in the art may understand that all or some of the procedures in the methods of the above embodiments may be implemented by a computer program instructing related hardware. The computer program may be stored in a nonvolatile computer-readable storage medium. When the computer program is executed, the procedures in the embodiments of the above methods may be performed. Any reference to the memory, the database, or other media used in the embodiments of the present disclosure may include at least one of a nonvolatile memory and a volatile memory. The nonvolatile memory may include a read-only memory (ROM), a magnetic tape, a floppy disk, a flash memory, an optical memory, a high-density embedded non-volatile memory, a resistive random access memory (Re-RAM), a magnetoresistive random access memory (MRAM), a ferroelectric random access memory (FRAM), a phase change memory (PCM), a graphene memory, etc. The volatile memory may include a random access memory (RAM) or an external cache memory. As an illustration rather than a limitation, the RAM may be in various forms, such as a static random access memory (SRAM) or a dynamic random access memory (DRAM). The database in the embodiments of the present disclosure may include at least one of a relational database and a non-relational database. The non-relational database may include a distributed database based on a blockchain, but is not limited thereto. The processor in the embodiments of the present disclosure may be a general processor, a central processor, a graphics processor, a digital signal processor (DSP), a programmable logic device, and a data processing logic device based on quantum computing, but is not limited thereto.

The technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs.

Particular examples are used herein for illustration of principles and implementation modes of the present disclosure. The descriptions of the above embodiments are merely used for assisting in understanding the method of the present disclosure and its core ideas. In addition, those of ordinary skill in the art can make various modifications in terms of particular implementation modes and the scope of application in accordance with the ideas of the present disclosure. In conclusion, the content of the description shall not be construed as limitations to the present disclosure.

What is claimed is:

1. A method for acquiring aerodynamic noise of a compressor, comprising:
   acquiring first aerodynamic noise frequency-domain data of a compressor in a historical time period under a target working condition continuously, wherein the first aerodynamic noise frequency-domain data comprises corresponding sound pressure levels of aerodynamic noise at different frequencies;
   performing inverse Fourier transform on the first aerodynamic noise frequency-domain data to obtain corresponding first aerodynamic noise time-domain data, wherein the first aerodynamic noise time-domain data comprises a sound pressure corresponding to each historical time step;
   determining an actual acquisition time of the first aerodynamic noise frequency-domain data according to all the historical time steps;
   determining a predicted aerodynamic noise time according to a target acquisition time and the actual acquisition time, wherein the predicted aerodynamic noise time comprises each future time step;
   with each future time step as an input, outputting a sound pressure corresponding to each future time step by a trained nonlinear autoregressive neural network model trained on the first aerodynamic noise frequency-domain data, wherein a training process of the nonlinear autoregressive neural network model comprises:
      selecting a certain proportion of the first aerodynamic noise time-domain data as training samples;
      training the nonlinear autoregressive neural network model with each historical time step in the training samples as an input and a predicted sound pressure as a label;
      optimizing the nonlinear autoregressive neural network model using Bayesian regularization algorithm;
      calculating a loss error between the predicted sound pressure output by the optimized nonlinear autoregressive neural network model and a corresponding actual sound pressure using a loss function; and when the loss error is less than a threshold, completing the training of the nonlinear autoregressive neural network model;

obtaining second aerodynamic noise time-domain data corresponding to the target acquisition time according to the sound pressure corresponding to each historical time step and the sound pressure corresponding to each future time step;

performing Fourier transform on the second aerodynamic noise time-domain data to obtain second aerodynamic noise frequency-domain data, wherein a frequency range corresponding to the second aerodynamic noise frequency-domain data is the same as a frequency range corresponding to the first aerodynamic noise frequency-domain data;

identifying a noise source based on the second aerodynamic noise frequency-domain data to determine a component of the compressor generating the aerodynamic noise; and controlling the component of the compressor generating the aerodynamic noise to reduce impact on surrounding environment.

2. The method for acquiring aerodynamic noise of a compressor according to claim 1, wherein a formula of the inverse Fourier transform is as follows:

$$f(t) = \frac{1}{2\pi}\int_{-\infty}^{\infty} F(\omega)e^{j\omega t}d\omega;$$

wherein f(t) represents the first aerodynamic noise time-domain data; F($\omega$) represents the first aerodynamic noise frequency-domain data; $\omega$ represents a frequency; and e is a Euler number.

3. The method for acquiring aerodynamic noise of a compressor according to claim 1, after obtaining the corresponding first aerodynamic noise time-domain data, further comprising:

preprocessing the first aerodynamic noise time-domain data, wherein the preprocessing comprises reversible instance normalization processing and data cleaning processing.

4. The method for acquiring aerodynamic noise of a compressor according to claim 1, wherein the loss function is expressed as:

$$J(\theta) = \frac{\sum_{i=1}^{n}(\widetilde{f(t)} - f(t))^2}{n}$$

wherein J($\theta$) represents a value of the loss function; $\widetilde{f(t)}$ represents the predicted sound pressure; f(t) represents the actual sound pressure, namely the first aerodynamic noise time-domain data; and n represents a number of training samples.

5. A computer system, comprising a memory, a processor, and a computer program stored on the memory and runnable on the processor, wherein the processor is configured to execute the computer program to implement operations comprising:

acquiring first aerodynamic noise frequency-domain data of a compressor in a historical time period under a target working condition continuously, wherein the first aerodynamic noise frequency-domain data comprises corresponding sound pressure levels of aerodynamic noise at different frequencies;

performing inverse Fourier transform on the first aerodynamic noise frequency-domain data to obtain corresponding first aerodynamic noise time-domain data, wherein the first aerodynamic noise time-domain data comprises a sound pressure corresponding to each historical time step;

determining an actual acquisition time of the first aerodynamic noise frequency-domain data according to all the historical time steps;

determining a predicted aerodynamic noise time according to a target acquisition time and the actual acquisition time, wherein the predicted aerodynamic noise time comprises each future time step;

with each future time step as an input, outputting a sound pressure corresponding to each future time step by a nonlinear autoregressive neural network model trained on the first aerodynamic noise frequency-domain data;

wherein a training process of the nonlinear autoregressive neural network model comprises:

selecting a certain proportion of the first aerodynamic noise time-domain data as training samples;

training the nonlinear autoregressive neural network model with each historical time step in the training samples as an input and a predicted sound pressure as a label;

optimizing the nonlinear autoregressive neural network model using Bayesian regularization algorithm;

calculating a loss error between the predicted sound pressure output by the optimized nonlinear autoregressive neural network model and a corresponding actual sound pressure using a loss function; and when the loss error is less than a threshold, completing the training of the nonlinear autoregressive neural network model;

obtaining second aerodynamic noise time-domain data corresponding to the target acquisition time according to the sound pressure corresponding to each historical time step and the sound pressure corresponding to each future time step;

performing Fourier transform on the second aerodynamic noise time-domain data to obtain second aerodynamic noise frequency-domain data, wherein a frequency range corresponding to the second aerodynamic noise frequency-domain data is the same as a frequency range corresponding to the first aerodynamic noise frequency-domain data;

identifying a noise source based on the second aerodynamic noise frequency-domain data to determine a component of the compressor generating the aerodynamic noise; and controlling the component of the compressor generating the aerodynamic noise to reduce impact on surrounding environment.

6. The computer system according to claim 5, wherein a formula of the inverse Fourier transform is as follows:

$$f(t) = \frac{1}{2\pi}\int_{-\infty}^{\infty} F(\omega)e^{j\omega t}d\omega;$$

wherein f(t) represents the first aerodynamic noise time-domain data; F($\omega$) represents the first aerodynamic noise frequency-domain data; $\omega$ represents a frequency; and e is a Euler number.

7. The computer system according to claim 5, after obtaining the corresponding first aerodynamic noise time-domain data, further comprising:
 preprocessing the first aerodynamic noise time-domain data, wherein the preprocessing comprises reversible instance normalization processing and data cleaning processing.

8. The computer system according to claim 5, wherein the loss function is expressed as:

$$J(\theta) = \frac{\sum_{i=1}^{n}(\overline{f(t)} - f(t))^2}{n}$$

wherein $J(\theta)$ represents a value of the loss function; $f(t)$ represents the predicted sound pressure; $f(t)$ represents the actual sound pressure, namely the first aerodynamic noise time-domain data; and n represents a number of training samples.

\* \* \* \* \*